United States Patent [19]

Pinson

[11] Patent Number: 4,860,968

[45] Date of Patent: Aug. 29, 1989

[54] COMMUNICATION LINK BETWEEN MOVING BODIES

[75] Inventor: George T. Pinson, Huntsville, Ala.

[73] Assignee: The Boeing Company, Seattle, Wash.

[21] Appl. No.: 182,025

[22] Filed: Apr. 15, 1988

[51] Int. Cl.$^4$ .......................... F41G 7/32; F42B 15/04
[52] U.S. Cl. .................................................... 244/3.12
[58] Field of Search ............... 244/3.12; 114/253, 254; 242/54 R, 118, 128

[56] References Cited

U.S. PATENT DOCUMENTS

| | | | |
|---|---|---|---|
| 3,613,619 | 10/1971 | DeNobel | 244/3.12 |
| 4,185,796 | 7/1980 | Riley | 244/3.12 |
| 4,573,647 | 3/1986 | Laten et al. | 244/3.12 |
| 4,611,771 | 4/1986 | Gibbons et al. | 244/3.12 |
| 4,770,370 | 9/1988 | Pinson | 244/3.12 |

FOREIGN PATENT DOCUMENTS 2391908 9/1978 France ............................. 244/3.12

OTHER PUBLICATIONS

Chaffee, C. David; "U.S. Military Programs Take Advantage of Fiber Optic Technology"; *Laser Focus/Electro-Optics;* 8/1986, pp. 80–83.

*Primary Examiner*—Charles T. Jordan
*Attorney, Agent, or Firm*—Finnegan, Henderson, Farabow, Garrett & Dunner

[57] ABSTRACT

Apparatus for optical fiber data link between two moving bodies remote controlled vehicle/missile such as ("RCV") and hereinafter launch platform includes fiber-wound bobbins having opposite winding directions on each body, interconnected with unwound, reinforced fiber sections, for streaming deployment from each bobbin through tensioning devices during relative separation movement between the two bodies. Image sensors and flight control mechanisms are operatively connected through a electric/optical I/O device to the fiber on the bobbin in the RCV, and data analysis/display devices and controller/command units are similarly interfaced with the fiber on the bobbin associated with the helicopter. The bobbin housing on the helicopter uses a shaped cavity and gimbal mount to provide free-streaming fiber deployment and pyrotechin or electro-mechanical separation device to discharge the bobbin and attached fiber after mission completion.

32 Claims, 6 Drawing Sheets

COMMUNICATION LINK BETWEEN MOVING BODIES

BACKGROUND OF THE INVENTION

1. Field of the Inventions:

The present invention relates to apparatus for communicating between moving bodies and to apparatus using hardwire and/or optical fiber for communicating with a moving body. The present invention also relates to guided missiles and other vehicles launched and controlled from a helicopter.

2. Descriptions of the Prior Art:

At the present time, the only means of communication between two moving bodies uses radio frequency ("RF") signals, and to a lesser extent, sound and optical signals. This requires that a transmitter and receiver be on board each of the moving bodies. Where one-way transmission is desired, the prime body uses a transmitter and the secondary body uses a receiver. The method of using RF transmitters is expensive due to the cost of the transmitters and receivers. The range is usually limited to line of sight ranges and the communications can be intercepted and/or jammed by unfriendly or unauthorized parties.

Communication using apparatus employing an optical fiber or electrically conducting wire between a fixed site and a moving missile is proven and demonstrated. In these apparatus, data is transmitted to the moving object from the fixed station and from the moving object to the fixed station. For the duration of flight however, the fixed station is literally fixed to a specific point. This prevents the station from moving to hide or obscure its position or to move in the event it is attacked.

One military application wherein the ability to change the location of the missile launch is particularly important is the helicopter which travels at relatively low speeds and altitudes compared to fixed wing aircraft. Three types of missiles are currently used as helicopter mounted weapons, but none provides the unique operational characteristics of the helicopter launched fiber optic guided remotely controlled vehicle ("RCV") disclosed hereinafter. The first type is free flight, a rocket propelled missile that is aimed and fired at a target. The free flight rocket flies unguided toward the target to impact within some predetermined footprint. The second type uses a fire-and-forget missile such as Hellfire. This missile is launched and homes onto a designated target. Future versions will likely be true fire-and-forget where a target is acquired, identified and attacked by the missile during flight. These systems are not currently able to attack targets of opportunity and require a cooperative target designator.

The third current weapon system is a wire guided missile and U.S. Pat. No. 4,611,771 to Gibbons et al. and U.S. Pat. No. 4,185,796 to Riley are representative of this technology. Although not depicted in use with a helicopter launch platform, these current hardwire or optical fiber missile guidance systems necessitate that the helicopter launch platform be relatively motionless with the target in sight by the gunner during the period between launch and impact since the missile flies to the aim point. These systems also require that both the missile and target be kept in sight until target impact during which time the helicopter is exposed to enemy fire.

French Patent No. 2,391,908 to Wieczorek proposes apparatus using optical fiber for communicating between moving jet aircraft. The apparatus includes a fiber optic cable stored on a winding drum incorporated in the tail section of the forward-positioned, unpiloted "missile" plane and connected to the nose section of a trailing, piloted aircraft. The cable can be played out from or retracted by the missile plane for changes in relative separation distance, and explosive severing devices can be included with the missile plane to assure rapid separation in the event of danger. However, this system does not contemplate or address the problem of rapid changes in both the speed and direction of the two moving aircraft and requires the piloted aircraft essentially to maintain the speed and direction of the unpiloted plane.

Hence, there still exists the need for apparatus to provide a hardwire and/or optical fiber data link between two moving bodies wherein the relative separation rates and distances between the bodies can be high and multidirectional. For example, an optical fiber guided RCV or missile having such apparatus would allow targets of opportunity to be attacked while the helicopter retreats to a place of relative safety. It would also provide the user with the capability of using the RCV or missile as a source of reconnaissance data and information.

SUMMARY OF THE INVENTION

In accordance with the invention, as broadly described herein, the apparatus for providing a data-link between two moving bodies comprises a continuous strand of a data-carrying fiber, and a pair of fiber bobbins, one carried by each of the two moving bodies. Respective parts of the continuous fiber strand are wound on each of the pair of bobbins, and an unwound part interconnects the pair of bobbins. Means are provided for deploying the wound fiber strand parts in streaming relation from each of said pair of bobbins during relative separation motion between the two bodies. There are also provided means operatively connected to the fiber strand portion remaining on the fiber bobbin carried by a first one of the moving bodies during deployment, for transmitting data along the deployed fiber strand, and means operatively connected to the fiber strand portion remaining on the fiber bobbin carried by the second, other moving body during deployment, for receiving data transmitted along the deployed fiber strand.

Preferably, the fiber strand is optical fiber and the wound fiber strand part on one of the bobbins is wound counter to the winding direction of the wound strand part on the other of the bobbins, whereby streaming deployment can occur with minimum strand twisting, and the fiber strand deploying means includes a pair of fiber tensioners, one associated with each of the fiber bobbins, operatively connected to control the tension in the fiber strand being deployed.

It is also preferred that second data transmitting means are operatively connected to the fiber strand portion remaining on the fiber bobbin associated with the other moving body and second data receiving means are operatively connected to the fiber strand portion remaining on the fiber bobbin associated with the one moving body, thereby affording two-way communication between the two moving bodies.

It is still further preferred that first and second data input/output means are respectively carried by the first and second moving bodies and are operatively connected to the respective optical fiber strand portions remaining on the first and second fiber bobbins during deployment. Also, means are provided for controlling the motion of the first moving body in response to control data, the motion controlling means being carried by the first body, being operatively connected to the first input/output means, and being responsive to control data transmitted from the second body. Still further, means are provided for sensing motion of the first moving body and generating sensed motion data, the motion sensing means being carried by the first body and operatively connected to the first input/output means, and controller means are provided responsive to the sensed motion data for generating control data, the controller means being carried by the second moving body and operatively connected to the second input/output means.

And it is still further preferred that the apparatus includes a plurality of sets of first and second moving bodies with associated connected elements, and that the controller means includes a data bus operatively connected to each of the plurality of second input/output means.

Further in accordance with the present invention, as embodied and broadly described herein, the method for providing data communication between two moving bodies, comprises the steps of providing a continuous strand of data-carrying fiber respective parts of which are wound on each of two separate bobbins, one of the bobbins being carried by each of the two bodies, and an unwound part of the fiber strand interconnecting the bobbins; deploying wound fiber simultaneously from each of the two bobbins during relative separating motion between the two bodies, the fiber strand continuing to interconnect the bobbins during the deploying step; and communicating with the unwound portions of fiber strand remaining on each of the bobbins during deployment. The communicating step includes the step of transmitting data to the unwound fiber strand portion on at least one of the bobbins and receiving the transmitted data from the unwound fiber strand portion on the other bobbin. Preferably, the deploying step includes the step of tensioning the fiber leaving each of the two bobbins.

Still further, in accordance with the present invention, as embodied and broadly described herein, the apparatus for deploying optical fiber from a moving horizontal platform such as a helicopter comprises a housing carried by the platform and having a relief formed in a housing surface facing outwardly from the platform, a bobbin pre-wound with optical fiber, the bobbin having a preferred deployment axis; and means for attaching the bobbin to the housing in the relief. The bobbin deployment axis extends outwardly from the relief and is movable along with the bobbin by the attaching means within a predetermined conical sector.

Preferably, the attaching means is a ball joint gimbal, and the relief is contoured to provide fiber deployment at oblique angles with respect to the normal to the bobbin surface without snagging or being impaired by the housing surface.

It is also preferred that the housing has means for selectively locking a free fiber end and releasing same at the time of deployment and bobbin ejector means for ejecting the bobbin from the housing at the conclusion of fiber deployment.

The accompanying drawing which is incorporated in and constitutes a part of this specification, illustrates several embodiments of the invention and, together with the description, serves to explain the principles of the invention.

Reference will now be made in detail to the present preferred embodiments of the invention, examples of which are shown in the accompanying drawing.

DESCRIPTION OF THE PREFERRED EMBODIMENTS

Figure 1:
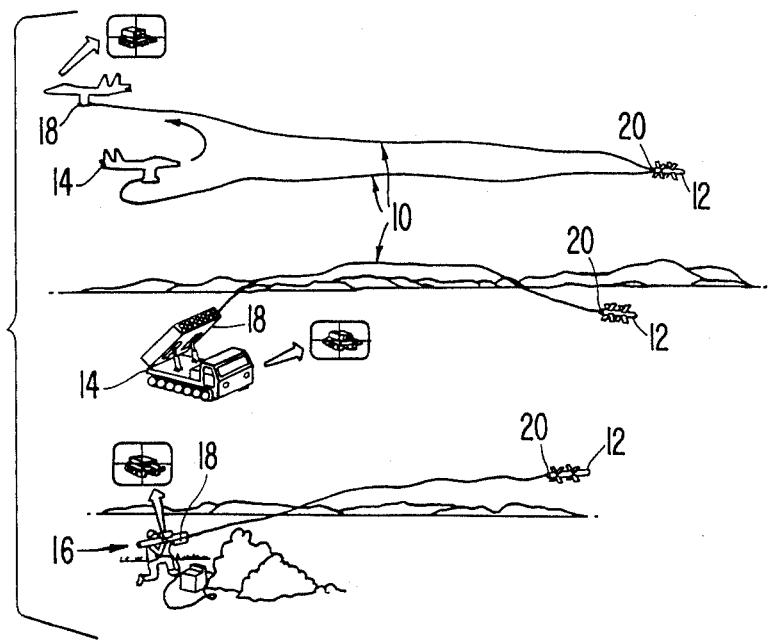
FIG. 1 depicts a military environment showing multiple applications of the present invention.

Referring initially to FIGS. 1 and 2A–2D, there are depicted examples of applications wherein the apparatus of the present invention for providing a data link between two moving bodies can advantageously be employed. Thus, as depicted in FIG. 1, an optical fiber or wire 10, hereinafter called a fiber, provides a two-way data connection between the missile 12 and carrier vehicle 14 or a man-portable unit 16. Each of missile 10, carrier vehicle 14 or man-portable unit 16 has attached to it a separate source of fiber which can be deployed by means to be described hereinafter. The two separate fiber sources 18 and 20 permit both missile 10 and either carrier vehicle 14 or man-portable unit 16 to move independently of each other while maintaining the ability to communicate with each other. It should be noted that missile 10 can be replaced with any type of moving airborne, water-borne or earth-borne vehicle or man-portable unit without violating the spirit of this invention. By use of couplers, such as couplers 21 (shown in FIGS. 2A–2D), multiple missiles can be attached to a common carrier. The individual units are interrelated over a common data bus by use of unique codes.

Figure 2A:
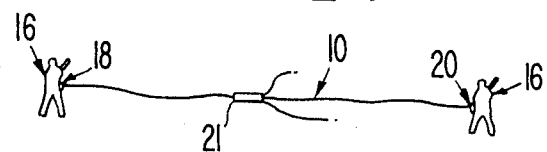
FIGS. 2A–2D depict four specific uses of the embodiment of the invention shown in FIG. 1.
Figure 2B:
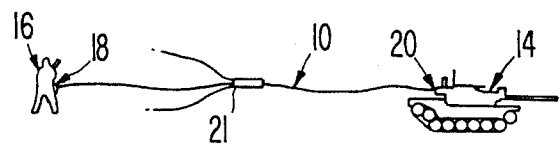
Figure 2C:
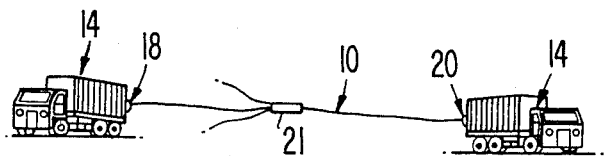
Figure 2D:
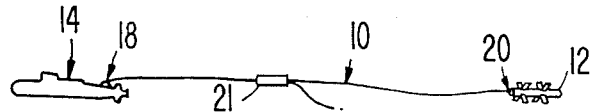

FIGS. 2A–2D better illustrate four of the various applications of the subject invention. As long as both of the moving bodies have a respective fiber source 18, 20 that permits the fiber 10 to be freely dispensed, any two of multiple bodies or stations can be used. This includes links between people (FIG. 2A), each moving in self-determined directions, people and vehicles where each moving independently (FIG. 2B), multiple vehicles moving independently (FIG. C), and between surface ships and/or submarines and torpedoes or missiles (FIG. 2D). The only restriction on communication is the length of the fiber contained in the respective sources and the relative strength of the fiber. Since the fibers can be spliced, multiple fiber sources and means to be described hereinafter can be used provided that repeaters are used and/or the total permitted transmission distances is not exceeded. At the current time, two-way transmission distances of up to about 100 km can be achieved without the need to resort to repeater type devices.

Figure 3:
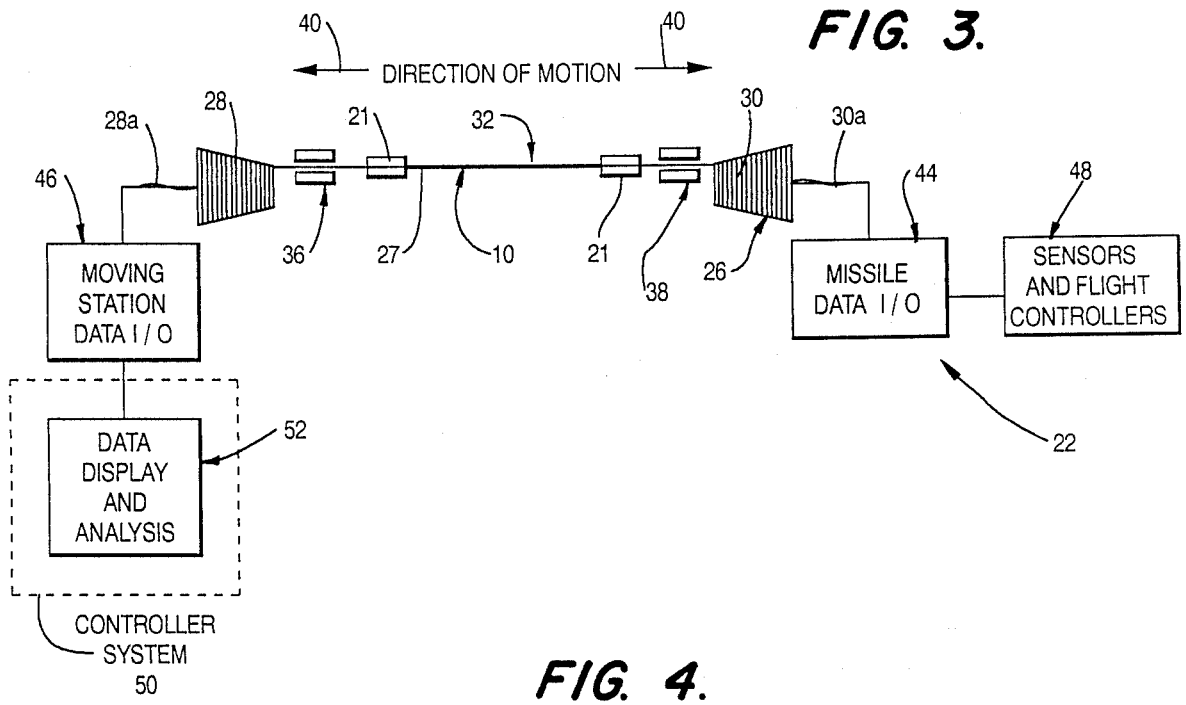
FIG. 3 is a schematic, block-diagram representations of elements of the embodiment inventions shown in FIG. 1.
Figure 6A:
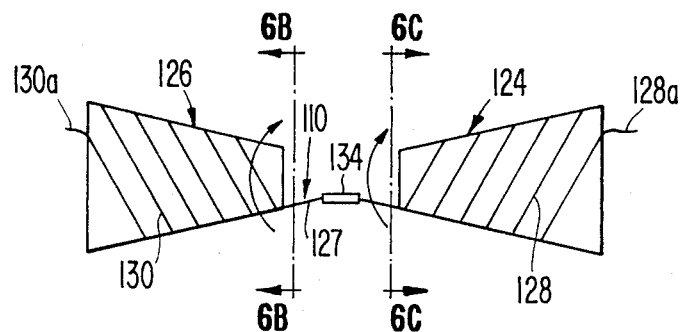
FIGS. 6A–6C depict elements of another embodiment of the present invention.

In accordance with the present invention, the apparatus for providing a datalink between two moving bodies includes a continuous strand of data-carrying fiber and a pair of fiber bobbins, one carried by each of the two moving bodies. Respective parts of the continuous fiber strand are wound on each of the bobbins and an unwound part interconnects the wound parts. As embodied herein with reference to FIG. 3, apparatus of the present invention generally designated by the numeral 22 includes fiber 10 and bobbins 24 and 26, associated e.g. with a moving station and a missile (both not shown for clarity), respectively. Fiber 10 includes unwound part 32 interconnecting wound fiber parts 28, 30. By "continuous strand" it is meant a fiber wherein data can flow without interruption, and continuous fiber strand 10 can be made up of multiple segments with one or more connecting couplers, such as couplers 21 shown in FIG. 3, or a connecting splice or splices, such as splice 134 shown in the embodiment in FIG. 6A. For the embodiment shown in FIG. 3, two couplers 21 are used with a length of reinforced fiber 27 interconnecting the couplers to make up unwound part 32. Reinforced fiber part 27 prevents damage to the exposed fiber part 32 during handling. In most applications, it is preferred that the two bobbins be wound separately and one or more couplers or splices be used between the two for ease of handling and assembly. The use of a reinforced section 27 between the bobbins provides additional strength to the fiber in the sections that are subject to handling during installation and to permit protective covers to be removed at the time of deployment.

Figure 6B:
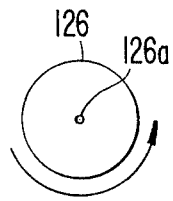
Figure 6C:
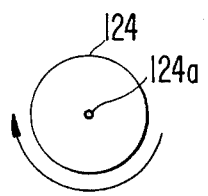

Also shown in FIGS. 6B and 6C is the preferred winding sense of wound fiber parts on the separate bobbins. In the embodiment shown in FIGS. 6A-6C, fiber parts 128, 130 are wound in opposite directions on bobbins 124, 126 (in clockwise and counterclockwise, respectively) carried by a helicopter-type carrier vehicle and a RCV-type missile, to be discussed in more detail henceforth. This winding pattern minimizes twisting during streaming deployment of fiber parts 128, 130 along bobbin axes 124a, 126a respectively. Alternately, the fiber can be twisted as it is placed on the bobbin opposite to the twist incurred during deployment to eliminate the twisting problem.

Figure 7:
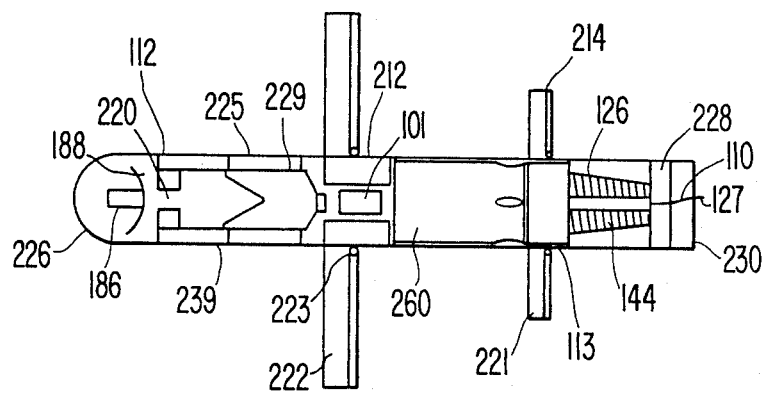
FIG. 7 is a schematic cross-section of an remote controlled vehicle ("RCV") incorporating elements of the embodiment shown in FIGS. 6A–6C.

Further in accordance with the present invention, the apparatus includes means for deploying the wound fiber strand parts in streaming relation from each of the pair of bobbins during relative separation motion between the two bodies. As embodied herein, and with reference again to FIG. 3, the deploying means includes a pair of tensioners 36, 38 associated with the moving bodies and operative to provide independent streaming of wound fiber parts 28, 30 respectively whenever the forces in the direction of relative separative motion (arrows 40) become greater than the braking force provided by the respective tensioner 36 or 38. Means also can be provided for protecting the fiber in specific applications, such as a reinforced connecting fiber portion (e.g. portion 127 in FIG. 6A) to protect against abrasion and hot launch gases during missile launch from a tube. See also FIG. 7 showing RCV-type vehicle 112 with bobbin 126, reinforced fiber section 127, and fiber protector shield 228.

Further in accordance with the present invention, the apparatus includes means operatively connected to the fiber strand portion remaining on the fiber bobbin carried by one of the moving bodies for transmitting data along the deployed fiber strand and means operatively connected to the fiber strand portion remaining on the fiber bobbin carried by the other moving body during deployment, for receiving the transmitted data. Preferably, each moving body carries both data transmitting and data receiving means for establishing two way communications between the bodies.

As embodied herein, and with reference again to FIG. 3, free end 30a of the wound fiber part 30 is connected to missile data input/output ("I/O") unit 44 and free end 28a of wound part 28 is connected to moving station I/O unit 46. I/O units 44, 46 are known, state-of-the-art devices that convert light-carried signals to electrical signals and vice versa and are used in the preferred embodiment where fiber 10 is an optical fiber. Missile sensor and flight controller 48 is operatively connected to I/O unit 44 to receive missile control instruction data and to supply missile flight sensor data. Moving station data display and analysis unit 52 of controller system 50 is operatively connected to moving station I/O unit 46 to receive missile flight sensor data and to supply missile flight control data.

In operation, the missile flight data output of missile sensor and controller unit 48, being electrical in nature, is converted into a generally digitized format and converted into light signals and transmitted to the moving station by missile station I/O unit 44. Moving station I/O unit 46 which is a duplicate of missile data I/O unit 44 converts the light signals to electrical signals and transmits digital data to data display and analysis unit 52 of controller system 50 for analysis and use. Thereafter, in response to the received flight information, appropriate missile control data can be generated and transmitted by controller system 50 to be described in more detail henceforth, back along the same optical fiber path for receipt and utilization by sensor and controller unit 48 after conversion by missile I/O unit 44.

Figure 4:
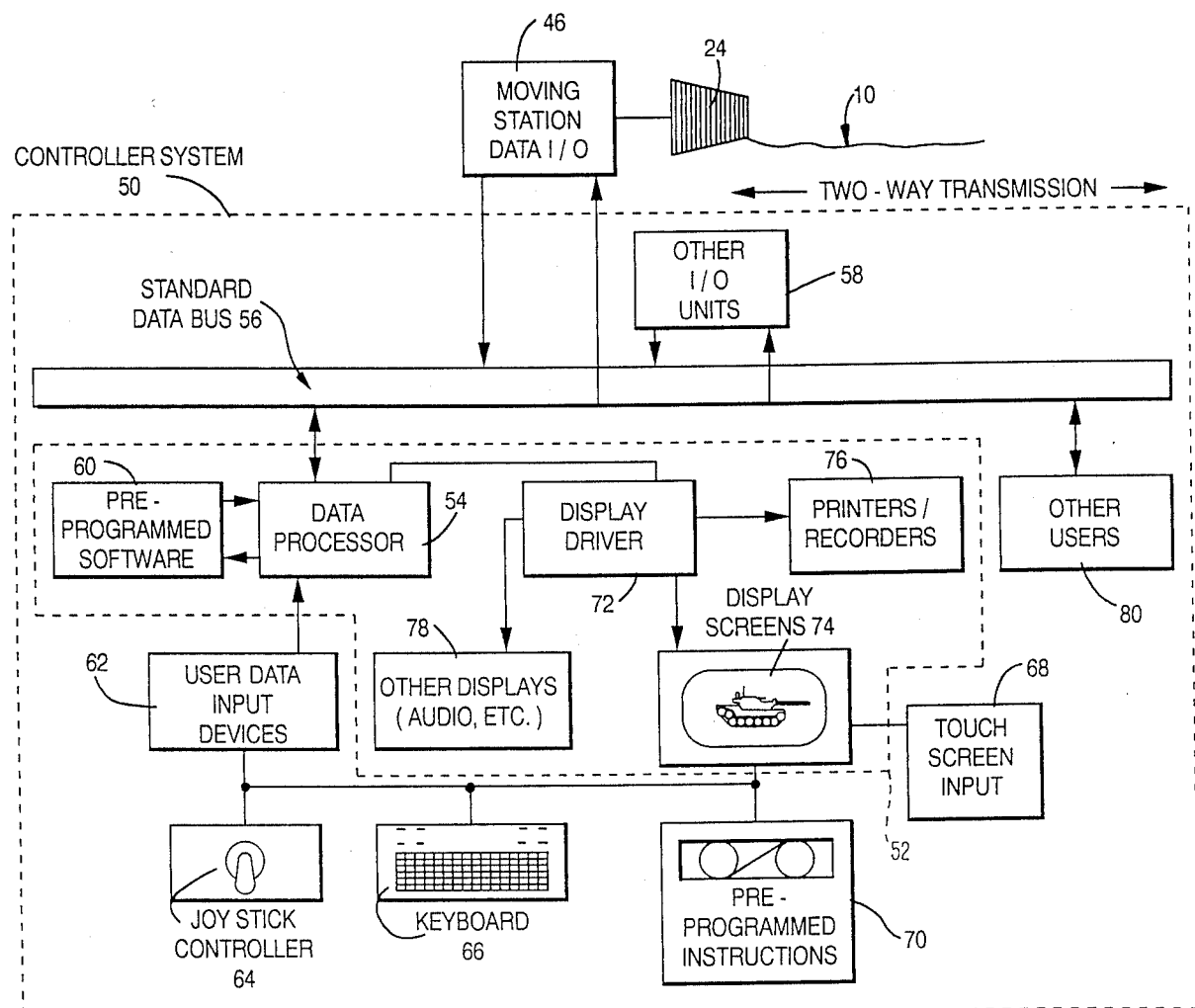
FIG. 4 is a expanded schematic of certain elements in the representations of FIG. 3.

FIG. 4 depicts controller system 50 for controlling data being transmitted in both directions over fiber 10 as it is unwound from bobbin 24. I/O unit 46 converts the incoming signal into a form that can be used e.g. by data processor 54 of system 50. A standard data bus such as bus 56 may be used to permit the interfacing with multiple fibers through additional I/O units 58 and/or to permit other users such as users 80 to have access to the incoming data. Data processor 54 operates on the incoming data and also operates on data to be transmitted using a combination of preprogrammed software 60 and inputs from the user. The preprogrammed software may include missile flight control software, image reconstruction or enhancement software, tracking software and other software subsets depending upon the application. User data input devices are preconditioned for input to data processor 54 by input device 62. User controlled devices can include such items as joy stick 64, keyboard 66, and/or touch screen 68. Preprogrammed instructions can be input using disk or tape drive 70. Output from data processor 54 is passed to display drive 72 which conditions the data for display on screen 74, printer and recorder 76, and/or other display devices 78 which can be audio devices, etc.

Figure 5:
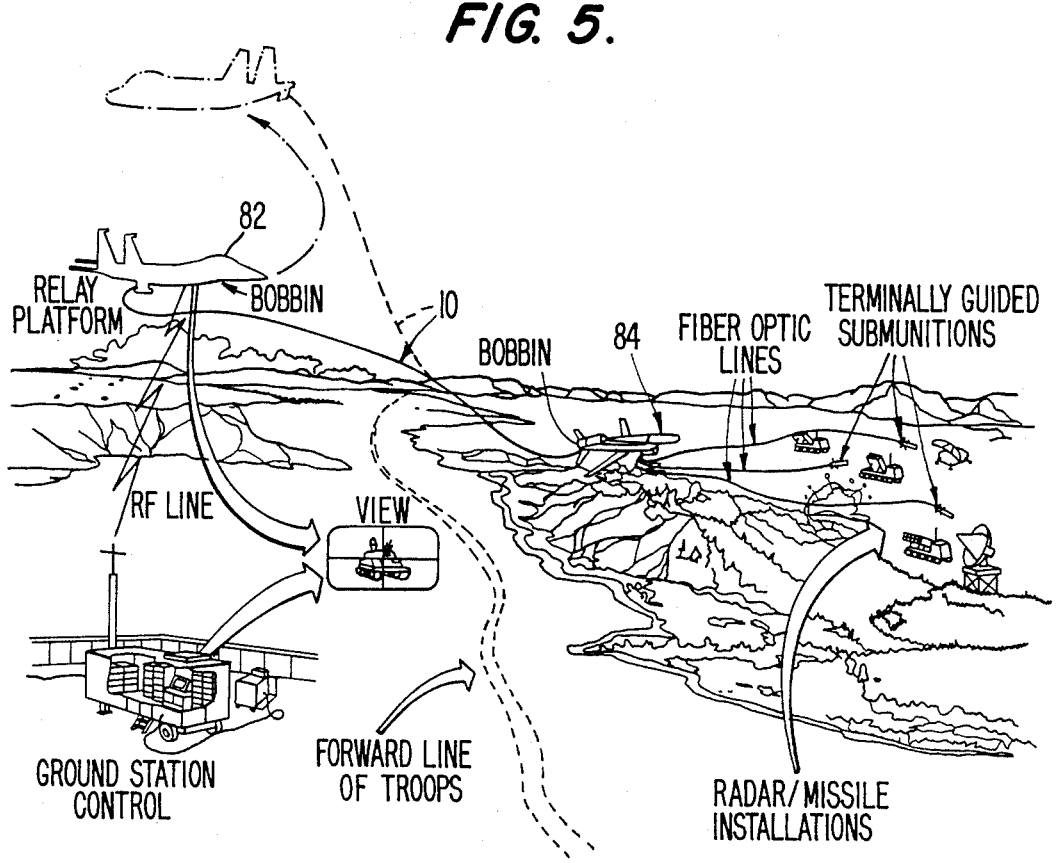
FIG. 5 is a depiction of another military environment for applications of the embodiment of the present inventions shown in FIG. 1.

FIG. 5 shows a typical operational overview of one specific embodiment of the subject invention. In this pictograph, aircraft 82 has released missile 84 for penetration into a hostile environment looking for potential threats and targets. Missile 84 is unreeling fiber 10 behind it, preferably an optical fiber over which is being transmitted data from its sensors, its speed, orientation, position, etc. User aircraft 82 meanwhile has moved to a safe position (shown dotted) while continuing to unreel its part of optical fiber 10 (also shown dotted) from bobbin 24 which, for fixed wing, high speed aircraft will be oriented to deploy fiber to the rear of the aircraft, because of the high drag on the fiber by the airstream. The user examines the incoming data and transmits commands to missile 84 where there follows the commanded course of action. It is recognized that the users are not constricted to be aircraft and/or missiles as are depicted in FIG. 5. Also, the choice of an optical fiber or wire is dependent upon the bandwidth required. Because of the very large bandwidth of the preferred optical fiber, the data can be combined video, other sensor data and audio.

Figure 8:
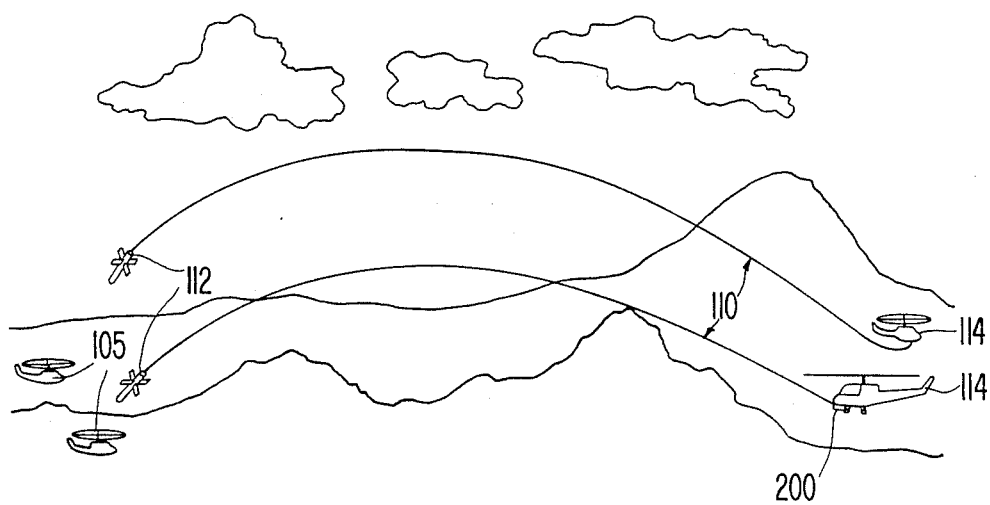
FIG. 8 depicts a military environment in which the embodiment of FIG. 6 can be used.
Figure 9:
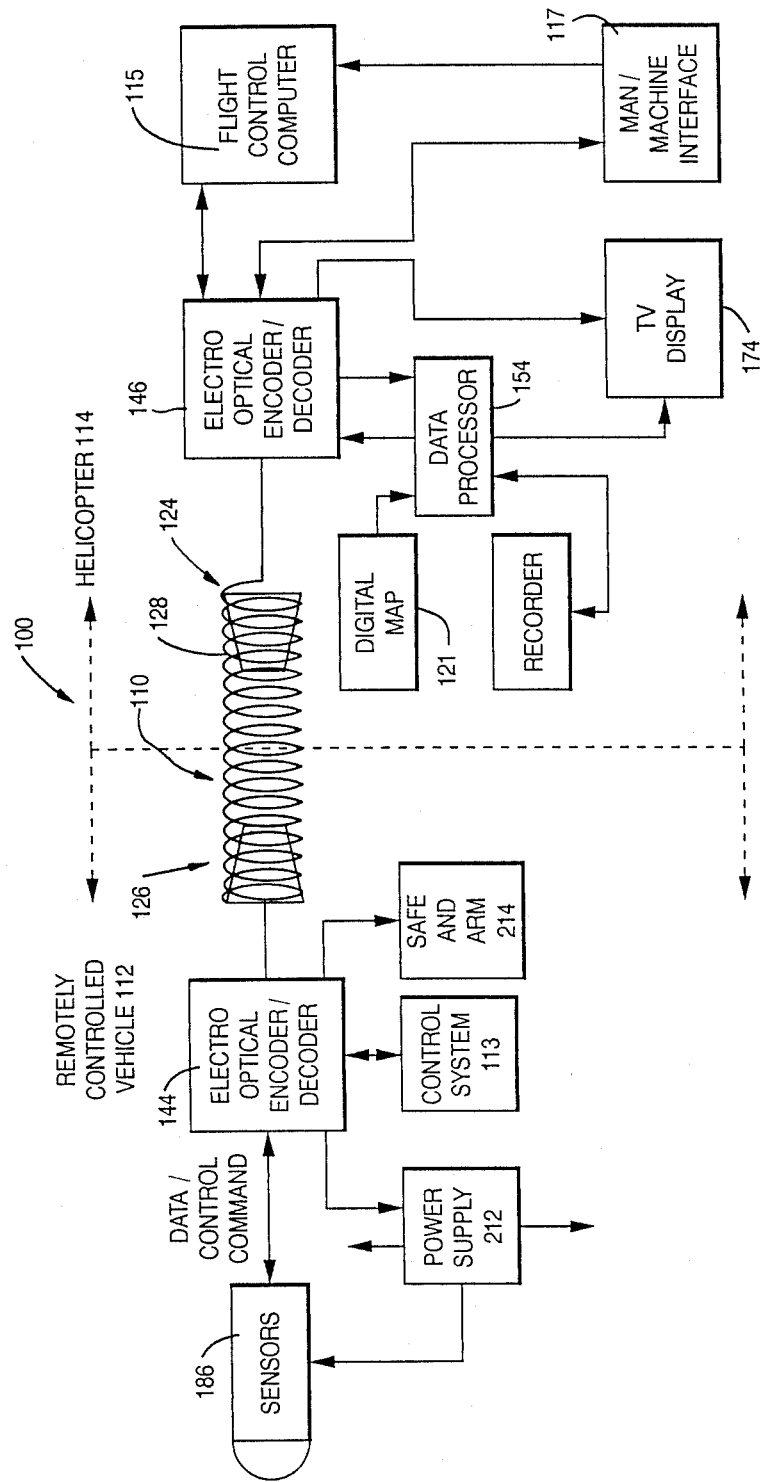
FIG. 9 is a schematic block-diagram representations of elements of the embodiment of FIGS. 6A–6C.

FIGS. 8 and 9 show another, more specific embodiment of the present invention designated generally 100, namely one in which helicopters serve as the carrier vehicle and RCV-type missiles are launched and guided using a fiber data-link. As shown in FIG. 8, helicopters 114 are equipped with launchers 200. Each launcher is loaded initially with one or more RCV's 112, and a communication link including an optical fiber 110 is provided between each helicopter and the respective RCV's. This system is unique since separate optical fiber bobbins 126, 124 are attached to each RCV and to the helicopter, respectively. This permits the helicopter to operate in defilade or normal flight to launch an RCV at target 105 and to independently move or maneuver after launch to avoid enemy detection or to escape from a threat while still maintaining control of the RCV.

With reference now to FIG. 9, the user control RCV 112 through man/machine interface 117 which is understood to collectively denote one or more specific components such as a touch screen input, joy stick, keyboard, etc. not shown for clarity. Interface 117 provides the means to launch the RCV, to control the direction of flight and to monitor the flight parameters as described in relation to the previous embodiment. Interface 117 also provides means to control line of sight sensor 186, to control the operation of the corresponding seeker, and to allow the user to select a specific target for close examination or to be attacked.

Television monitor 174 operatively connected to data processor 154 and I/O unit 146, is of a high resolution quality. Monitor 174 provides quality video imaging in addition to providing the capability for displaying computer generated characters, processed data, RCV status information, and navigational information via data processor 154. Flight control computer 115 provides the means to automatically fly the RCV, in lieu of overriding commands from the user, through man/machine interface 117. RCV control system 113 data together with pointer/tracker data from sensor 186 are transmitted to flight control computer via optical fiber 110, analyzed, and used to determine flight parameters. The flight path of RCV 112 is determined and housekeeping performed to maintain a stable flight path as specified by control computer 115 and/or operator-user through man/machine interface 117. Altimeter 101 can be used as part of control system 113 (see FIG. 7) to provide information concerning the height of the RCV above ground level.

Generally, navigation is a difficult problem when RCV 112 is at an extended distance from helicopter 114. In the present preferred embodiment, navigation is performed using map matching where sensor 186 imaging data is compared with digital map 121 stored in data processor 154. Alternate, additional navigational means can include a multisensor package 188 consisting of rate sensors and accelerometers (see FIG.7) to perform inertial navigation for applications having short flight times. Real time navigation corrections and flight path changes by the operator are provided through man/machine interface 117. Data processor 154 in addition to performing the navigation using a can be adapted to provide automatic target recognition using a stored prebriefed target library, cueing, target identification, and other detail image processing as desired to permit the use of visible, IR and/or MMW imagery devices for sensor 186, as one skilled in the art would understand and appreciate.

In operation, helicopter borne electro/optical encoder/decoder 146 serves as an I/O device to convert and format information in the form of electrical signals from man/machine interface 117, data processor 154 and flight controller 115 into an optical signal compatible with single mode optical fiber 110. The single mode fiber permits a higher data rate and longer distance between repeaters than does the more commonly used dualmode fiber. Helicopter borne bobbin 124 deploys wound portion 128 of optical fiber 110 whenever the force on the fiber exceeds a predetermined value by means of a tensioner (not shown) and by further means which will be described henceforth.

Figure 10:
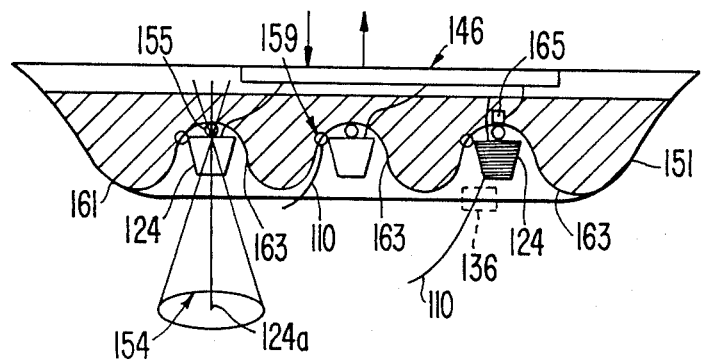
FIG. 10 is a schematic cross-section of the helicopter bobbin housing element of the embodiment of FIGS. 6A–6C.
Figure 11:
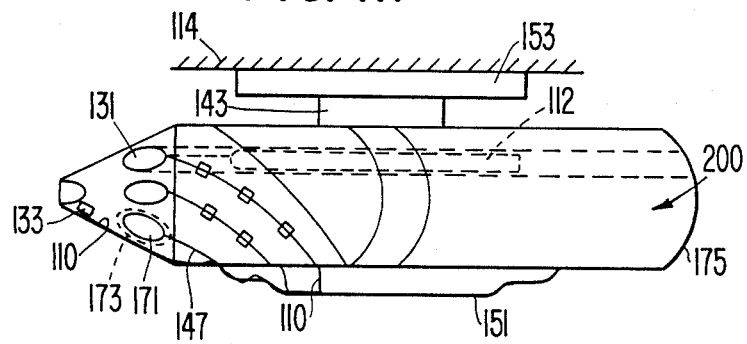
FIG. 11 is a schematic plan view of an RCV launcher usable with the embodiment of FIGS. 6A–6C.

Further, in accordance with the present invention, the apparatus for deploying optical fiber from a moving platform such as a helicopter includes a housing carried by the platform and having a relief formed in a housing surface facing outwardly from the platform. A bobbin pre-wound with optical fiber and having a preferred fiber deployment axis is mounted in the housing relief by attaching means so that the bobbin axis extends outwardly from the relief and is movable along with the bobbin within a predetermined conical sector. As embodied herein, and with reference to FIGS. 10 and 11, helicopter borne bobbins 124 are arranged in bobbin housing 151 such that minimum interference with the fiber occurs. Housing 151 is shown mounted to the underside of RCV missile launcher 200 which, in turn, is mounted to helicopter 114 via connections between launcher hard point 143 and helicopter hard point 153 (FIG. 11). Housing 151 which can be metal, or preferably a lightweight, high strength, composite, has an overall aerodynamic shape 157 to minimize drag and turbulence.

Housing 151 specifically includes outwardly-facing surface 161 having one or more reliefs 163 formed therein (three being shown in FIG. 10), one for each bobbin 124. Reliefs 163 have a contoured shape such as the bell-shape shown in FIG. 10 to allow fiber deployment from the reliefs at oblique angles to the vertical without snagging. Each bobbin 124 is attached to the housing 151 through ball joint gimbal 155 that permits a desired number of degrees of conical freedom (see cone 154) to axis 124a of bobbin 124 as helicopter 114 maneuvers. Fiber release device 159 (FIG. 10) is used to prevent premature deployment of fiber 110 and can be a circular solenoid which is automatically opened by a timer element (not shown) located in flight control computer 115. Upon release, optical fiber 110 is left free to dispense from bobbin 124, or fiber 110 can be controlled via tensioner 136 (shown dotted in FIG. 10), according to the forces generated by the helicopter's movements from the launch position. Tensioner 136, which could be a roller assembly with a progressive clutch, can be adjusted to prevent excess fiber deployment such as might be caused by the downwash from a hovering helicopter. The contoured bell shape of housing relief 163 assures that fiber 110 can be dispensed in any direction without snagging. Optical fiber 110 is connected to electro-optical encoder/decoder 146 and the data routed as depicted in FIG. 9.

Means such as ejector 165 preferably are included with each bobbin 124 so that the bobbin can be ejected from the helicopter bobbin housing 124 after it is used. Ejector 165 can be a pyroelectric device or an electromechanical solenoid that automatically ejects or releases the bobbin 124 at a predetermined time after RCV launch, at user command, or at fiber depletion. This avoids the helicopter having to drag around expended fibers which could cause a problem during flight or upon landing.

Referring now to FIG. 11, optical fiber 110 which can be reinforced fiber is routed from each RCV 112 until it exists the respective tube 131 of launcher 200. Groove 147 is formed in the launcher 200 from the reinforced fiber exit to the helicopter bobbin housing 151 for each fiber 110. The reinforced fiber is placed into the groove preferably in a press fit although it may be held in place if desired by adhesives or by strips of adhesive 133. At launch, the reinforced fiber, designed to survive the forces that remove the fiber from groove 147 remains in the groove until helicopter movement imparts forces on the fiber which pulls the fiber from the groove. The freed fiber 110 is subsequently dispersed from helicopter borne bobbin 124. As the helicopter moves after launch, for instance to evade return fire, the forces on the fiber in grooves 147 exceed the holding strength and the fiber is released. One or multiple launchers 200 may be attached to helicopter 114, with each launcher made up of one or multiple launch tubes 131. The forward portion of launcher 200 may preferably include means such as aerodynamic fairing 171 having flaps 173 (one being shown in dotted lines) to permit the RCV to be launched and to minimize aerodynamic drag 173 during flight. A contoured aft fairing such as fairing 175 may be provided to reduce base drag.

A suitable RCV for use with the fiber data-link apparatus of the present invention will now be discussed. Referring initially to FIG. 7 sensor 186 can be of any type that provides required target and navigation data to the user. The use of known dual mode IR/MMW seekers with imaging capability, visible light or IR imaging seekers will meet the requirements. Warhead tunnel 220 is provided down the length of the RCV for warhead jet formation. Warhead 229 is activated by contact or proximity fuzes 226 and is enabled by safe-and-arm system 214 activated by the operator over the optical fiber 110 data link. Power supply 212 provides onboard power. Fins/wings 222 fold and lock through hinges 223. Either fin actuators 221 or gas jet controllers (not shown) can be used for flight control. Electro-optical encoder/decoder 144 is mounted within bobbin 126 which is hollow. Reinforced fiber section 127 is used to protect the fiber during handling and during launch. Means such as prescored frangible cover 228 can be used to protect the bobbin and the optical fiber from the firing of ejection motor 230 at the time of launch. RCV airframe 225 is standard except that a high-lift, high-performance type suitable for fly-by-wire control can be used.

Figure 12:
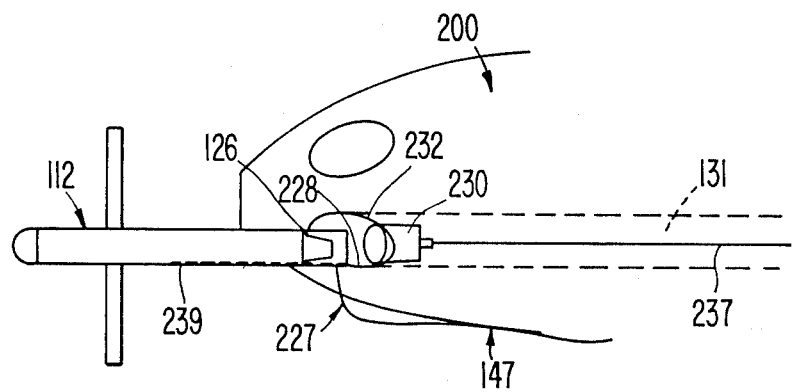
FIG. 12 is a schematic cross-section of the launcher shown in FIG. 11.

With reference now to the schematic in FIG. 12, launch motor igniter wiring 237 is fed through launch tube 131 to the launch controller which, as discussed previously, can be flight control computer 115. RCV bobbin 126 is positioned inside the casing of RCV 112. The reinfoced fiber section 127 is routed from the bobbin 126 through frangible fiber connector 228, and within fiber relief slot 239 in airframe 225 of RCV 112. RCV is pushed into launch tube 131 and in so doing, snubber 232 comprising a spring steel clip is depressed. Snubber 232 prevents ejector motor 230 from leaving launcher 200 after the motor is fired. Sustainer motor 260 (see FIG. 7) is not ignited until the RCV leaves the launcher.

Figure 13A:
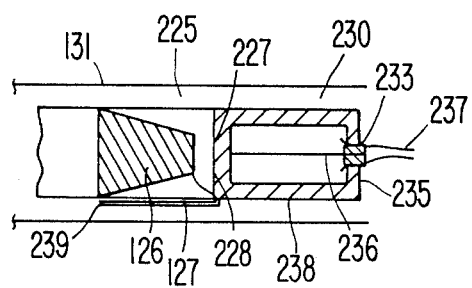
FIGS. 13A and 13B are schematic partial cross-sections of the RCV of FIG. 7 before and after launch from the launcher of FIG. 11, respectively.
Figure 13B:
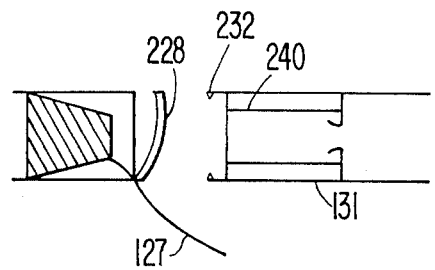

As illustrated in FIGS. 13A and 13B, igniter 236 via wiring 237 through nozzle plug 233 to man/machine interface 117, is used to initiate the launch of RCV 112. Igniter 236 activates propellant 238 in motor 230, pressure builds up in chamber 235 and nozzle plug 233 is ejected. The launch command also activates the power supply 212 (see FIG. 9) located in the RCV. Following ignition, ejection motor 230 forces the RCV out of launch tube 131. Snubber 232 stops ejector case 240 while permitting the RCV to continue in flight. Reinforced fiber part 127 is pulled from slot 239 in the side of the RCV such that just after RCV 112 exits from launch tube 131, frangible fiber protector 228 is removed and the fiber is pulled from bobbin 126.

It will be apparent to those skilled in the art that various modifications and variations could be made in the fiber data-link apparatus of the present invention without departing from the scope or spirit of the invention.

What is claimed is:

1. Apparatus for providing a data-link between two moving bodies comprising:
   a continuous strand of a data-carrying fiber;
   a pair of fiber bobbins, one carried by each of the two moving bodies, respective parts of said continuous fiber strand being wound on each of said pair of bobbins, and an unwound part interconnecting said pair of bobbins;
   means for deploying said wound fiber strand parts in streaming realtion from each of said pair of bobbins during relative separation motion between the two bodies;
   means operatively connected to the fiber strand portion remaining on the fiber bobbin carried by one of the moving bodies during deployment, for transmitting data along said deployed fiber strand; and
   means operatively connected to the fiber strand portion remaining on the fiber bobbin carried by the other moving body during deployment, for receiving data transmitted along said deployed fiber strand.

2. The apparatus as in claim 1 wherein said wound fiber strand part on one of said bobbins is wound counter to the winding direction of the wound strand part on the other of said bobbins, whereby streaming deployment can occur with minimum strand twisting.

3. The apparatus as in claim 1 further including data sensing means operatively connected to said data transmitting means and data processing means operatively connected to said data receiving means.

4. The apparatus as in claim 1 further including second data transmitting means operatively connected to the fiber strand portion remaining on the fiber bobbin associated with said other moving body and second data receiving means operatively connected to the fiber strand portion remaining on the fiber bobbin associated with said one moving body, thereby affording two-way communication between the two moving bodies.

5. The apparatus as in claim 4 further including data sensing means and moving body control means, both being operatively connected to the fiber strand portion remaining on the fiber bobbin associated with said one moving body.

6. The apparatus as in claim 1 wherein said fiber strand deploying means includes a pair of fiber tensioners, one associated with each of said fiber bobbins, operatively connected to control the tension in the fiber strand being deployed.

7. The apparatus as in claim 3 further including data display means operatively connected to said data processing means.

8. The apparatus as in claim 4 further including data processing means and user data input means, both being operatively connected to the fiber strand portion remaining on the fiber bobbin associated with said other moving body.

9. The apparatus as in claim 1 wherein said fiber strand is optical fiber.

10. Apparatus for providing a data-link between a first moving body to be controlled via control data and a second moving body for controlling the first moving body in response to sensed motion data, the apparatus comprising elements:
(a) at least one continuous strand of data-carrying optical fiber;
(b) a first fiber bobbin carried by said first moving body;
(c) a second fiber bobbin carried by said second moving body, respective parts of said continuous optical fiber strand being wound on each of said first and second fiber bobbins, the winding direction on said first bobbin being opposite the winding direction on said second bobbin, and an unwound fiber strand part interconnecting said first and second bobbins;
(d) means for deploying said wound optical fiber strand from each of said first and second bobbins during relative separation motion between said first and second bodies;
(e) first and second data input/output means respectively carried by said first and second moving bodies and being operatively connected to the respective optical fiber strand portions remaining on said first and second fiber bobbins during deployment;
(f) means for controlling the motion of said first moving body in response to control data, said motion controlling means being carried by said first body, being operatively connected to said first input/output means, and being responsive to control data transmitted from said second body;
(g) means for sensing motion of said first moving body and generating sensed motion data, said motion sensing means being carried by said first body and being operatively connected to said first input/output means; and
(h) controller means responsive to said sensed motion data for generating control data, said controller means being carried by said second moving body and being operatively connected to said second input/output means.

11. The apparatus as in claim 10 wherein said apparatus includes a plurality of sets of elements (a)–(g), and wherein said controller means includes a data bus operatively connected to each of the plurality of second inpu/output means.

12. The apparatus as in claim 10 wherein said controller means includes a data analysis and display means including a data processor.

13. The apparatus as in claim 12 wherein said controller means includes a display driver means an at least one audio/visual display unit operatively connected thereto, said display driver means being operatively connected to said data processor.

14. The apparatus as in claim 12 wherein said controller means includes user input preconditioning means operatively connected to said data processor, and at least one user input device operatively connected to said preconditioning means.

15. The apparatus as in claim 12 wherein said data analysis and display means includes user-interactive display terminal, operatively connected to said data processor through display driver means and user input preconditioning means arranged in parallel circuit paths.

16. The apparatus as in claim 12 wherein said data processor is controlled by preprogrammed software.

17. A method for providing data communication between two moving bodies, the method comprising the steps of:
providing a continuous strand of data-carrying fiber respective parts of which are wound on each of two separate bobbins, one of the bobbins being carried by each of the two bodies, and an unwound part of the fiber strand interconnecting the bobbins;
deploying wound fiber simultaneously from each of the two bobbins during relative separating motion between the two bodies, the fiber strand continuing to interconnect the bobbins during said deploying step; and
communicating with the unwound portions of fiber strand remaining on each of the bobbins during deployment, said communicating step including the step of transmitting data to the unwound fiber strand portion on at least one of the bobbins and receiving the transmitted data from the unwound fiber strand portion on the other bobbin.

18. The method as in claim 17 wherein the deploying step includes the step of tensioning the fiber leaving each of the two bobbins.

19. The method as in claim 17 wherein said communicating step includes the steps of transmitting and receiving data to/from the unwound fiber strand portions on each of the two bobbins.

20. The method as in claim 17 wherein the fiber strand is an optical fiber strand, and wherein said transmitting and receiving steps include the steps of optically transmitting and receiving data.

21. Apparatus for deploying optical fiber from a moving platform such as a helicopter, comprising:
a housing carried by the platform and having a relief formed in a housing surface facing outwardly from the platform;
a bobbin pre-wound with optical fiber, said bobbin having a preferred deployment axis; and
means for attaching said bobbin to said housing in said relief, said bobbin deployment axis extending outwardly from said relief and being movable along with each bobbin by said attaching means within a predetermined conical sector.

22. The apparatus as in claim 21 wherein said attaching means is a ball joint gimbal.

23. The apparatus as in claim 21 wherein said relief is contoured to provide fiber deployment at oblique angles with respect to the normal to said bobbin surface without snagging.

24. The apparatus as in claim 21 wherein said housing is aerodynamically configured.

25. The apparatus as in claim 21 wherein said housing has a plurality of said reliefs, a plurality of said attaching means, and a plurality of said fiber wound bobbins, one of said bobbins being attached in each of said reliefs by a respective one of said attaching means.

26. The apparatus as in claim 21 further including a missile carried by the platform for launching therefrom, said fiber wound bobbin having a free fiber end operatively connected to said missile.

27. The apparatus as in claim 21 wherein said fiber wound bobbin has a free fiber end, and wherein said housing has means for selectively locking said free fiber end and releasing same at the time of deployment.

28. The apparatus as in claim 21 further including tensioning means for preventing fiber deployment except during actual platform movement.

29. The apparatus as in claim 21 further including bobbin ejector means for ejecting said bobbin from said housing at the conclusion of fiber deployment.

30. The apparatus as in claim 29 wherein said bobbin ejector means is selected from the group consisting of pyro-electric devices and electro-mechanical solenoids.

31. The apparatus as in claim 26 further including missile launch means attached to the platform, said launch means including an elongated mounting member and a launch tube for carrying said missile, said elongated mounting member having a groove formed in a surface thereof for holding a length of said fiber between said free end and said bobbin, and said elongated member further including means for retaining said fiber length in said groove and releasing said fiber length upon platform movement from a missile launch position.

32. The apparatus as in claim 31 wherein said bobbin housing is attached to said elongated member.

* * * * *

UNITED STATES PATENT AND TRADEMARK OFFICE
CERTIFICATE OF CORRECTION

PATENT NO. : 4,860,968
DATED : August 29, 1989
INVENTOR(S) : GEORGE T. PINSON

It is certified that error appears in the above-identified patent and that said Letters Patent is hereby corrected as shown below:

IN THE SPECIFICATION:

Column 8, line 24, after "navigation" insert
--functions-- and delete "using a".

IN THE CLAIMS:

Column 12, line 18, change "inpu" to --input--.

Signed and Sealed this

Thirty-first Day of July, 1990

Attest:

HARRY F. MANBECK, JR.

*Attesting Officer*  *Commissioner of Patents and Trademarks*